United States Patent
Luke et al.

(10) Patent No.: US 11,050,668 B2
(45) Date of Patent: *Jun. 29, 2021

(54) FLOW-BASED LOAD BALANCING

(71) Applicant: Comcast Cable Communications, LLC, Philadelphia, PA (US)

(72) Inventors: Chris Luke, Galloway, NJ (US); Anthony Veiga, Mount Holly, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,798

(22) Filed: Feb. 8, 2018

(65) Prior Publication Data
US 2018/0367458 A1  Dec. 20, 2018

Related U.S. Application Data

(63) Continuation of application No. 15/360,618, filed on Nov. 23, 2016, now Pat. No. 9,929,961, which is a continuation of application No. 14/306,783, filed on Jun. 17, 2014, now Pat. No. 9,548,927.

(51) Int. Cl.
| | |
|---|---|
| *H04L 12/803* | (2013.01) |
| *H04L 12/741* | (2013.01) |
| *H04L 12/733* | (2013.01) |
| *H04L 12/729* | (2013.01) |
| *H04L 12/707* | (2013.01) |
| *H04L 12/721* | (2013.01) |
| *H04L 12/743* | (2013.01) |
| *H04L 12/851* | (2013.01) |

(52) U.S. Cl.
CPC .......... *H04L 47/125* (2013.01); *H04L 45/122* (2013.01); *H04L 45/125* (2013.01); *H04L 45/22* (2013.01); *H04L 45/38* (2013.01); *H04L 45/74* (2013.01); *H04L 45/7453* (2013.01); *H04L 47/122* (2013.01); *H04L 47/2483* (2013.01)

(58) Field of Classification Search
None
See application file for complete search history.

(56) References Cited

U.S. PATENT DOCUMENTS

| | | | |
|---|---|---|---|
| 2011/0261811 A1* | 10/2011 | Battestilli | H04L 67/1025 370/389 |
| 2013/0223442 A1* | 8/2013 | Narayanan | H04L 49/25 370/389 |
| 2015/0146539 A1 | 5/2015 | Mehta et al. | |

OTHER PUBLICATIONS

Uppal, "OpenFlow Based Load Balancing," University of Washington, Spring 2010.
Wang, et al., "OpenFlow-Based Server Load Balancing Gone Wild," Princeton University, published prior to filed of present application.

(Continued)

*Primary Examiner* — Kouroush Mohebbi
(74) *Attorney, Agent, or Firm* — Banner & Witcoff, Ltd.

(57) ABSTRACT

Methods and apparatuses are described for virtualizing routing of network traffic by offloading routing decisions to a controller in communication with a plurality of network devices. For load balancing applications, the controller may make up-front decisions as to both destination and route, rather than wait until traffic has been routed to a load balancing point before determining the destination.

24 Claims, 11 Drawing Sheets

(56) References Cited

OTHER PUBLICATIONS

"Will OpenFlow commoditize hardware?—Part 1," Jason Edelman's Blog at http://jedelman.com/1/post/2013/09/will-openflow-commoditize-hardware-part-1.html, Sep. 2013.
"Will OpenFlow commoditize hardware?—Part 2," Jason Edelman's Blog at http://jedelman.com/1/post/2013/09/will-openflow-commoditize-hardware-part-2.html, Sep. 2013.
Edelman, "Examining Traffic & Flow Distribution," published prior to filed of present application.
Shahmir, "Stochastic Switching Using OpenFlow," Norwegian University of Science and Technology, Jul. 2013.

* cited by examiner

FLOW-BASED LOAD BALANCING

CROSS-REFERENCE TO RELATED APPLICATION

This application is a continuation of and claims priority to U.S. patent application Ser. No. 15/360,618, filed on Nov. 23, 2016, and entitled "Flow-Based Load Balancing." U.S. patent application Ser. No. 15/360,618 is a continuation of and claims priority to U.S. patent application Ser. No. 14/306,783, filed on Jun. 17, 2014, and entitled "Flow-Based Load Balancing" (now U.S. Pat. No. 9,548,927). The entire contents of these applications are incorporated herein by reference in their entirety.

BACKGROUND

Commercially available hardware load balancers that act as a gateway for network traffic are well-known. These load balancers typically distribute network traffic amongst a collection of directly-attached servers directly by rewriting the destination address of incoming packets to that of the desired destination server. However, such load balancers are generally not very good at distributing amongst geographically disparate destination servers, at least not without routing traffic in an inefficient way such as by "hair-pinning" the traffic back outward into the wide area network. Even then, conventional load balancing relies on a single instance of the hardware device or a logical cluster at a single physical location. There is typically no geographically diverse failover.

While techniques such as so-called "global" load balancing (which uses a domain name system to redirect traffic) and Anycast (which advertises an IP address into routing protocols from multiple origin locations), are sometimes used to supplement the single-instance hardware load balancers, even systems using a combination of all three techniques still suffer from load balancing challenges such as inefficient routing over large geographic areas and single points of failure. Moreover, recent limited experiments in OpenFlow-based load balancing have failed to successfully address these and other problems.

SUMMARY

The following summary is for illustrative purposes only, and is not intended to limit or constrain the detailed description.

Load balancing and routing of traffic to and from a pool of load-balanced resources may be integrated. Rather than routing traffic to a traditional load balancer and then having the load balancer determine where to distribute the load, both the route and the destination may be determined together. In fact, both the route and the destination may be determined at the first instance that a new packet is detected in a network for which a route and destination have not already been established.

Packets may be logically arranged in flows, such as flows of data packets between the same source address and destination address. For each packet that is part of a flow that the network device does not have instructions for, a network device receiving the packet may query a controller to determine how to handle the packet. The controller, in response to the query, may determine a destination and a route to and/or from that destination, and the controller may respond to the network device with instructions on how to forward that packet to the next hop in the route, which may also apply to future packets in the same flow. The controller may or may not also instruct other network devices in the determined route as to how to forward the packet. Where a network device receives a packet of a flow for which the network device has instructions, the network device may follow those instructions without necessarily needing to contact the controller. As will be described herein, the controller may be configured to use information about the software application utilizing the flow and/or information about the network and/or the servers such as network congestion, server utilization, and/or other information, to make a holistic determination of both the destination for network traffic in a flow and the route to the destination.

Accordingly, aspects as described herein are directed to, for example, determining, based at least on a destination address indicated by a data packet, a plurality of routes to a plurality of destinations, and selecting a first route of the plurality of routes to a first destination of the plurality of destinations. Instructions may be sent, such as from the controller to one of the network devices, to route the data packet along at least a portion of the first route.

Further aspects as described herein are directed to, for example, determining a route to one of a plurality of destinations each associated with a destination address of a data packet, and selecting, from a plurality of network devices, a set of network devices along the route. Instructions may be sent, such as by the controller, to the set of network devices for routing the data packet along at least a portion of the route.

Still further aspects as described herein are directed to, for example, the following. Responsive to a message from a first network device identifying at least a portion of a header of a data packet, the at least a portion of the header may be used to determine a plurality of route/destination pairs for a plurality of destinations. A first route/destination pair may be selected from the plurality of route/destination pairs, and instructions may be sent, such as from the controller, to the first network device for forwarding the data packet to a second network device in a route of the first route/destination pair.

The summary herein is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure.

Figure 1:
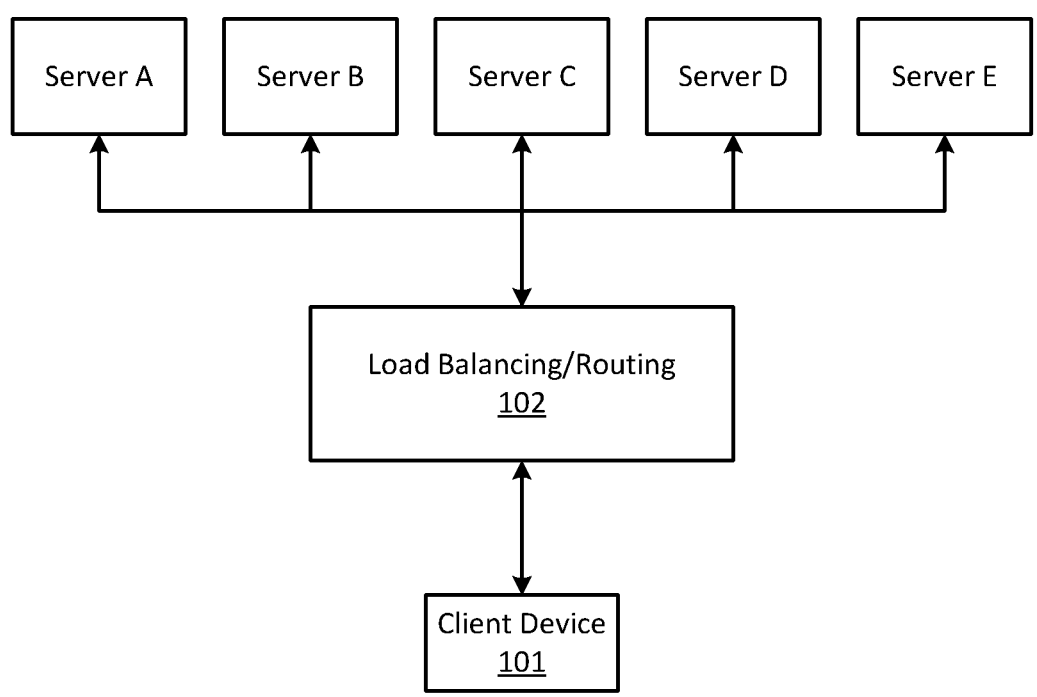
FIG. 1 illustrates an example system in which various features described herein may be implemented in accordance with one or more aspects as described herein.

FIG. 1 illustrates an example system in which various features described herein may be implemented in accordance with one or more aspects as described herein. The system of FIG. 1 includes one or more client devices (such as a client device 101), a load balancing/routing function 102, and a plurality of servers (such as Server A, Server B, Server C, Server D, and Server E), which may be, for example, origin servers arranged as one or more pools of origin servers. While five servers are shown in the present example, there may be fewer than or more than five servers.

The client device 101 may be any type of computing device, such as but not limited to a personal computer (e.g., a desktop computer, a laptop computer, a tablet computer, etc.), a smart phone (e.g., a cellular phone), a video gaming system, an automobile computer, a GPS device, a set top box, a television set, a server, a gateway, a modem, a router, a switch, a controller, and/or the like. The client device 101 may be communicatively coupled with the load balancing/routing function 102 via, for example, one or more wired communication lines, one or more networks, and/or one or more wireless links. Where a network is used to communicate between the client device 101 and the load balancing/routing function 102, the client device 101 may be outside the network or a device that is part of the network such as a network router or network switch.

the load balancing/routing function 102 may be implemented as one or more computing devices, such as one or more servers, routers, switches, gateways, and/or other types of computing devices. While illustrated in FIG. 1 as a single block, the load balancing/routing function 102 may actually comprise a plurality of interconnected and distributed physical devices and, as will be described below in greater detail, may be implemented using the same devices that make up a network for distributing messages between the client device 101 and Servers A-E.

While servers A-E are labeled as "servers" in the example of FIG. 1, servers A-E may each be any types of one or more computing devices, such as but not limited to servers (such as origin servers), personal computers, routers, switches, gateways, output devices, and/or the like. Moreover, any of servers A-E may be geographically co-located with one another or geographically dispersed from one another, as desired. For example, two or more of servers A-E may be in separate states, thousands of miles from each other, coupled to different local networks (that are in turn coupled to each other through one or more wider area networks), in different countries, etc. As will be discussed further below, the holistic integration of load balancing and routing decisions, as may be accomplished herein, may allow for a plurality of servers to be part of the same load balancing pool, regardless of whether the servers in the pool are geographically (and/or topologically in the network) disparate from one another.

In operation, the client device 101 may send a message toward load balancing/routing function 102 directed to a destination associated with a pool of servers such as Servers A-E, and the load balancing/routing function 102 may selectively distribute the message to one (or a subset of) the pool of servers. For example, the message may be sent as one or more data packets, such as by a web browser executing on the client 101 requesting information from a web page at a certain virtual address that happens to be associated with the server pool of servers A-E. In such a case, two or more of servers A-E may each store the web page and may each act as a web server for the requested web page. In response to the message, the load balancing/routing function 102 may make a decision as to how to distribute the message, and to which one or more of servers A-E to distribute the message to, based on one or more factors. The one or more factors may include, for example, current reported utilizations or other status of one or more of the servers, predicted future utilizations or other status of one or more of the servers, congestion, errors, other monitored states of one or more communication paths between the client device 101 and one or more of the servers, an identity of the client device 101 and/or of a user of the client device 101, a characteristic of the message, the time of day, the day of week, and/or a preference of the user of the client device 101 and/or otherwise associated with the client device 101. In response to the message, the one or more of servers A-E that receive the message may reply with their own message.

Figure 2:
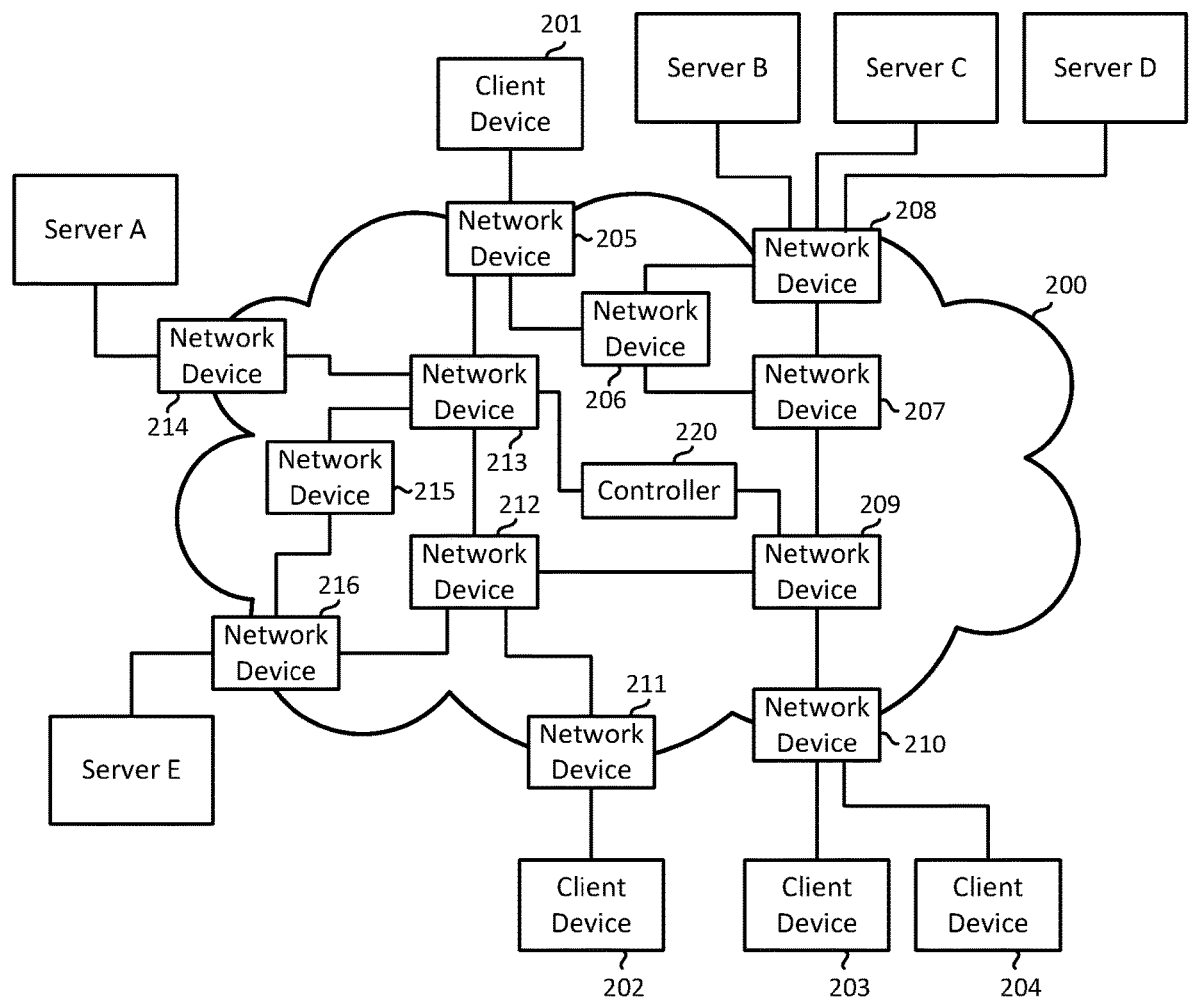
FIG. 2 illustrates another example system in which various features described herein may be implemented in accordance with one or more aspects as described herein.

FIG. 2 illustrates another example system in which various features described herein may be implemented in accordance with one or more aspects as described herein. In some embodiments, FIG. 2 may be a more detailed illustration of the system of FIG. 1. For example, the client device 101 in FIG. 1 may be the same client device as any of client devices 201-204 in FIG. 2, and the load balancing/routing function 102 may be implemented by one or more of the elements of FIG. 2, such as by any of elements 205-216 and 220. Moreover, servers A-E of FIG. 1 may be the same servers as servers A-E of FIG. 2. In other embodiments, the two systems of FIGS. 1 and 2 are entirely separate embodiments.

The example system of FIG. 2 includes one or more client devices (such as client devices 201, 202, 203, and 204), a network 200 comprising one or more network devices (such as network devices 205-216), and one or more controllers (such as controller 220) that may be part of network 200 and/or outside of network 200. Each of the client devices 201-204 may be implemented as one or more computing devices, such as but not limited to a personal computer (e.g., a desktop computer, a laptop computer, a tablet computer, etc.), a smart phone (e.g., a cellular phone), a video gaming system, an automobile computer, a GPS device, a set top box, a television set, a server, a gateway, a modem, a router, a switch, a controller, and/or the like.

Each of the network devices 201-216 may also be implemented as one or more computing devices, such as but not limited to a router, a switch, a gateway, etc. In general, each of the network devices 201-216 may be configured to receive messages and forward those message (modified or intact) to another device. For example, the network device 205 may be configured to forward messages received from any of the client device 201, the network device 206, and/or the network device 213 to any one or more of the client device 201, the network device 206, and/or the network device 213. One or more of the network devices (for example, the network devices 205, 208, 210, 211, 214, and/or 216) may be edge routers and may provide routing and/or switching functionality between the network 200 and devices outside of the network 200. One or more others of the network devices (for example, the network devices 207, 209, 212, 213, and/or 215) may be core routers within the network 200.

While the network 200 is represented in FIG. 2 as a single cloud, the network 200 may be a single network or a collection of multiple connected networks. By way of example, the network 200 may be or otherwise include the Internet and/or another IP-based network, an intranet, a telephone network, a local area network (LAN), a wide area network (WAN), a wireless (e.g., cellular network), a satellite network, an Ethernet network, a wi-fi network, an optical fiber network, a coaxial cable network, and/or a hybrid fiber/coax distribution network. In some embodiments, core routers (e.g., the network device 213) may be a core router of the Internet backbone and edge routers (e.g., the network device 205) may provide a client device (e.g., the client device 201) with access to the Internet. Others of the network devices may provide connectivity between the core routers and the edge routers. Also, while the various client devices 201-204 are shown as being communicatively coupled to a respective network device (such as the network device 205), each client device may also be part of a local network (such as an Ethernet and/or wi-fi network) that provides connectivity between the client device and the edge router.

In the example of FIG. 2, while the controller 220 is depicted as a single block, from a physical standpoint the controller 220 may be implemented as a single device (such as a single server or personal computer) or as a plurality of distributed devices (such as a plurality of servers and/or personal computers). Moreover the controller 220 may be part of the network 200 or outside of the network 200. In either case, the controller 220 may be communicatively coupled to one or more of the network devices 205-216. Moreover, the controller 220 may be physically integrated into and/or share computing resources with any one or more of the network devices 205-216 or be a physically separate computing device from the network devices 205-216.

As will be described further below, the controller 220 may be configured to provide one or more of the network devices 205-216 with instructions for routing packets through the network 200. In operation, when one of the network devices 205-216 receives a packet that is not part of an existing flow (e.g., an existing connection), then the network device may send a request message (such as through the network 200) to the controller 220 for instructions on how to route packets for the flow. In response, the controller 220 may determine one or more candidate destinations, determine how to route such packets to the one or more candidate destinations, choose one of the candidate destination/route pairs, and send a response message to one or more of the network devices (including the requesting network device) indicating how to route the packets for the flow based on the chosen candidate destination/route pair. Thus, rather than network devices in a routing path making their own routing decisions, those decisions may be offloaded to the controller 220 that is not in-line with the routing path and that may have knowledge of relevant information about the network that may not be directly available to the network devices. Compared with traditional load balancers that are in-line with the routing path and are typically one or two hops away from the origin server (the ultimate destination), the controller 220 may be located anywhere inside or outside of the network 200, close to the ultimate destination or far from the destination, and in-line with the routing path or outside of the routing path, as desired. In fact, the route and the ultimate destination may be completely determined even before the packet is routed by the network device. To accomplish this, a receiving network device may inform the controller 220 about incoming packets that are not part of existing flows (to the knowledge of the network device), and the controller 220 may instruct that network device and any other network devices along a determined routing path what to do with the packets. In some embodiments, the routing request/response function may be performed using OpenFlow or another type of communications protocol suitable for such a purpose. Thus, in such embodiments, the controller 220 may be considered an OpenFlow controller. In making routing decisions, the controller 220 may have knowledge of information about the network such as network topology, information about destination servers, information about network link status, and/or the like. To obtain the knowledge of network topology, the controller 220 may, for example, send discovery packets throughout the network in a known way, where responses to the discovery packets may be used by the controller 220 to determine the network topology.

Figure 3A:
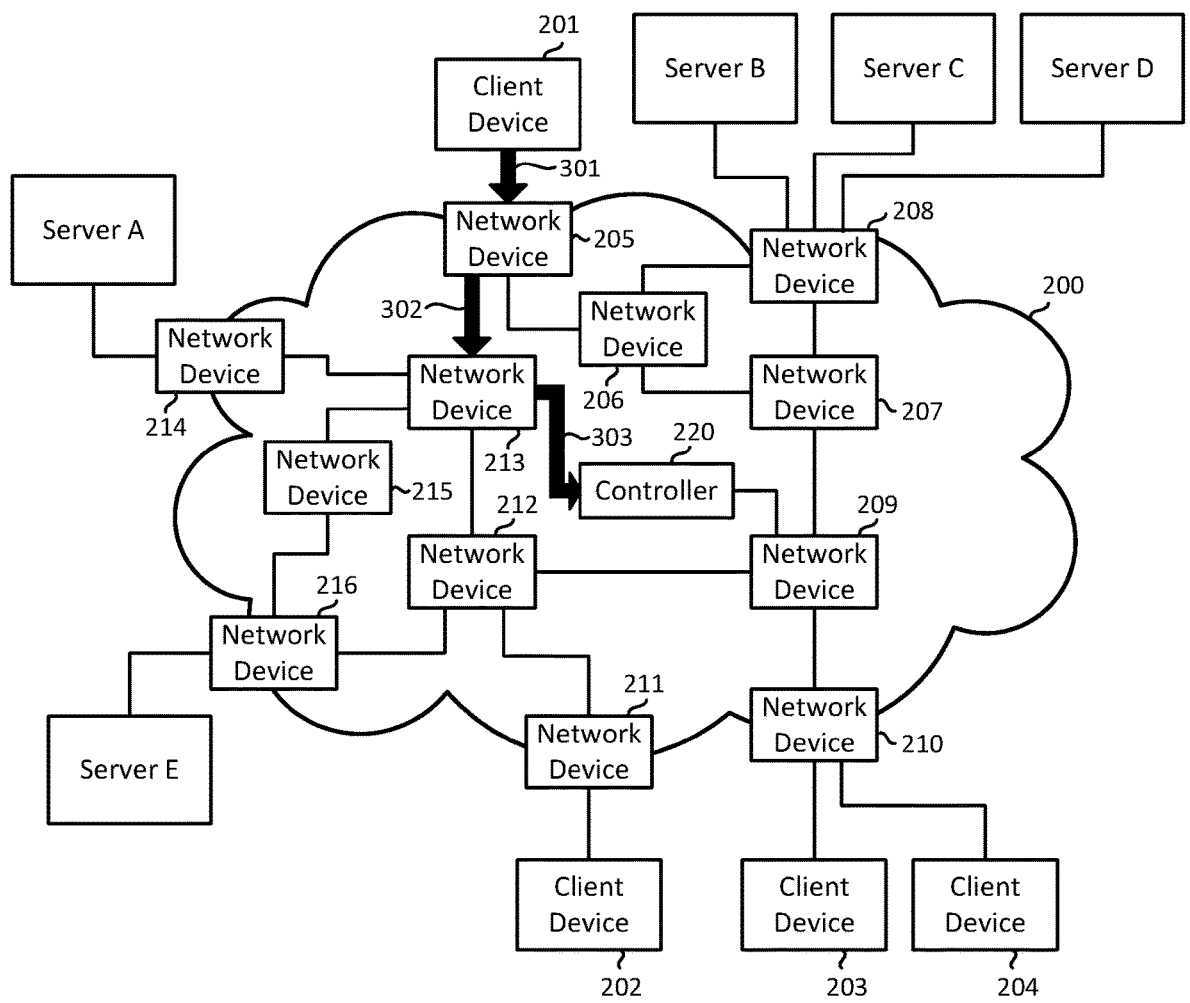
FIGS. 3A-3C illustrate the system of FIG. 2 with an example of performing a process in accordance with one or more aspects as described herein.
Figure 3B:
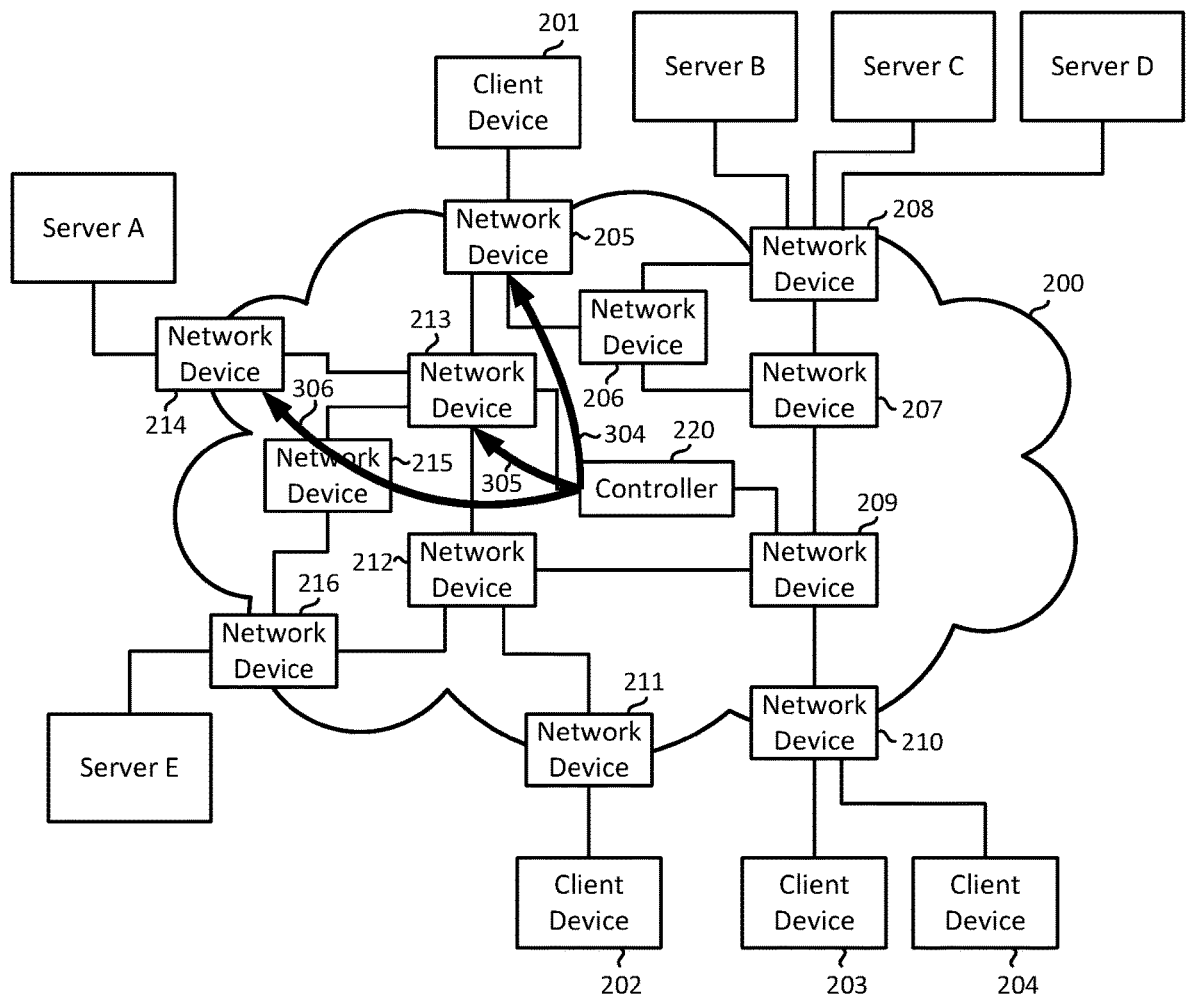
Figure 3C:
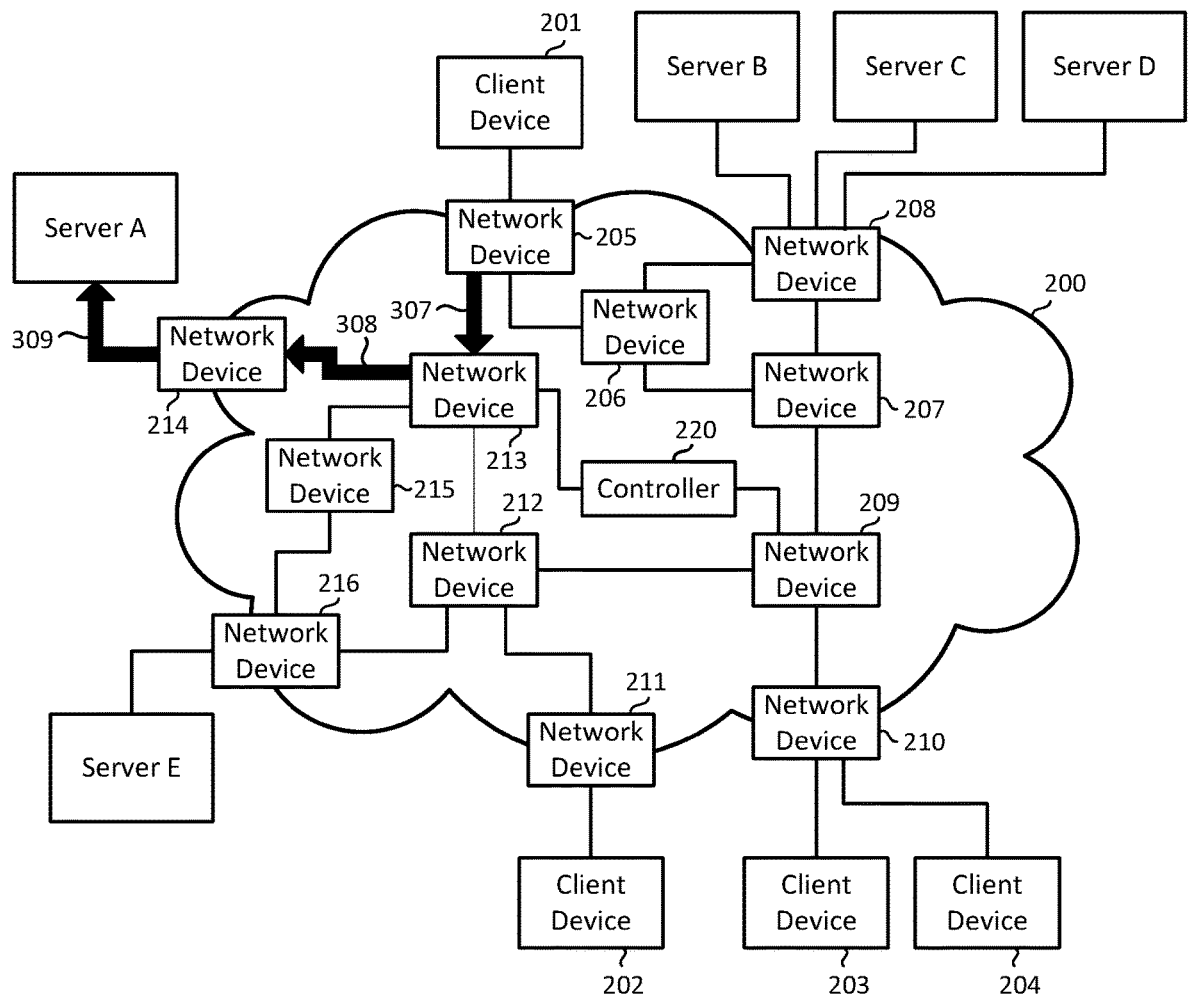

An example of how using the controller 220 to make routing decisions is described with reference to FIGS. 3A-3C. In these figures, thick arrows represent information being sent between devices, with the arrow indicating the direction of information flow. Referring to FIG. 3A, the client device 201 in this example may send a data packet to the network device 205 (which may be, for example, an edge router of the network 200), as indicated by arrow 301. The data packet may be sent directly between the client device 201 or via one or more communication links and/or sub-networks. The data packet may be, for example, an IP packet, an Ethernet packet, a TCP/IP packet, one type of packet encapsulated inside another type of packet, or any other type of packet. In any of these cases, the packet may include information, usually in a header, indicating a source address of the packet (e.g., the address of the client device 201 and/or of a device sending the packet to the network device 205 on behalf of the client device 201) and a destination address of the packet. The source and destination addresses may be in the form of any network addresses, such as but not limited to IP addresses. The packet (such as in the header) may also identify other information such as an protocol (e.g., an IP protocol number), one or more ports (such as source and destination port numbers), a quality of service marking such as a DSCP marking, and/or the like. In response to receiving the packet, the network device 205 may examine the packet to extract information (such as from the header) to allow the network device 205 to determine whether the packet is part of an existing flow. For instance, the network device 205 may recognize that the packet has the same source address and destination address as other packets that it has recently forwarded, and so it may consider this packet to be part of the same flow as those other packets. To determine whether the received packet is part of an existing flow, the network device 205 may compare information from the packet with flow instructions (such as, for example, flow table entries contained in a flow table) stored by and/or otherwise accessible to the network device 205. The flow table entries (and/or other flow instructions) may be updated in accordance with information previously provided by the controller 220. In the present example, it will be assumed that the received packet is not part of an existing flow, as determined by the network device 205. In response to such a determination, the network device 205 may send a request to the controller 320, as indicated by arrows 302 and 303.

In response to the request, the controller 220 may determine an appropriate route and/or destination for the packet. As explained herein, the controller 220 may take one or more factors into account to make this determination, such as but not limited to current reported utilizations or other status of one or more of the servers, predicted future utilizations or other status of one or more of the servers, congestion, errors, or other problems detected on one or more communication paths between the client device 201 and one or more of the servers, an identity of the client device 201 and/or of a user of the client device 201, a characteristic of the message, the time of day, the day of week, and/or a preference of the user of client device 201 and/or otherwise associated with the client device 201.

Assume, for this example, that the controller 220 determines that the route for this flow will be from the network device 205 to network device 213, then to the network device 214, and then to Server A. In making the decision, the network device 213 may have selected from a possible pool of servers such as any of Servers A-E. In this case, referring to FIG. 3B, the controller 220 may send instructions to each of these three network devices for how to route the data, as indicated by arrows 304, 305, and 306. For example, the instructions to the network device 205 may indicate that it should forward packets of the flow to the network device 213, the instructions to the network device 213 may indicate that it should forward packets of the flow to the network device 214, and the instructions to the network device 214 may indicate that it should forward packets of the flow to Server A. The instructions may also include instructions for routing return packets in the flow from Server A to the client device 201, although the return (downstream) route may or may not be the same as the upstream route from the client device 201 to Server A. In addition, the instructions to the network device 214 (the penultimate device providing the last upstream hop) may include instructions for modifying the destination addresses of the upstream packets in the flow to the ultimate destination (e.g., Server A), and/or instructions for modifying the source address of the downstream return packets in the flow to the service address the flow is for (e.g., an address expected by the client device 201 so that load balancing between the pool of origin servers may be transparent to the client device 201).

The network devices 205, 213, and 215 may update their respective flow tables (each of the network devices may maintain their own unique flow tables) in accordance with the instructions and then forward the packet (and future packets in the flow) in accordance with the updated flow tables. Thus, in the present example, the packet may be routed as indicated in FIG. 3C by arrows 307, 308, and 309.

Figure 4:
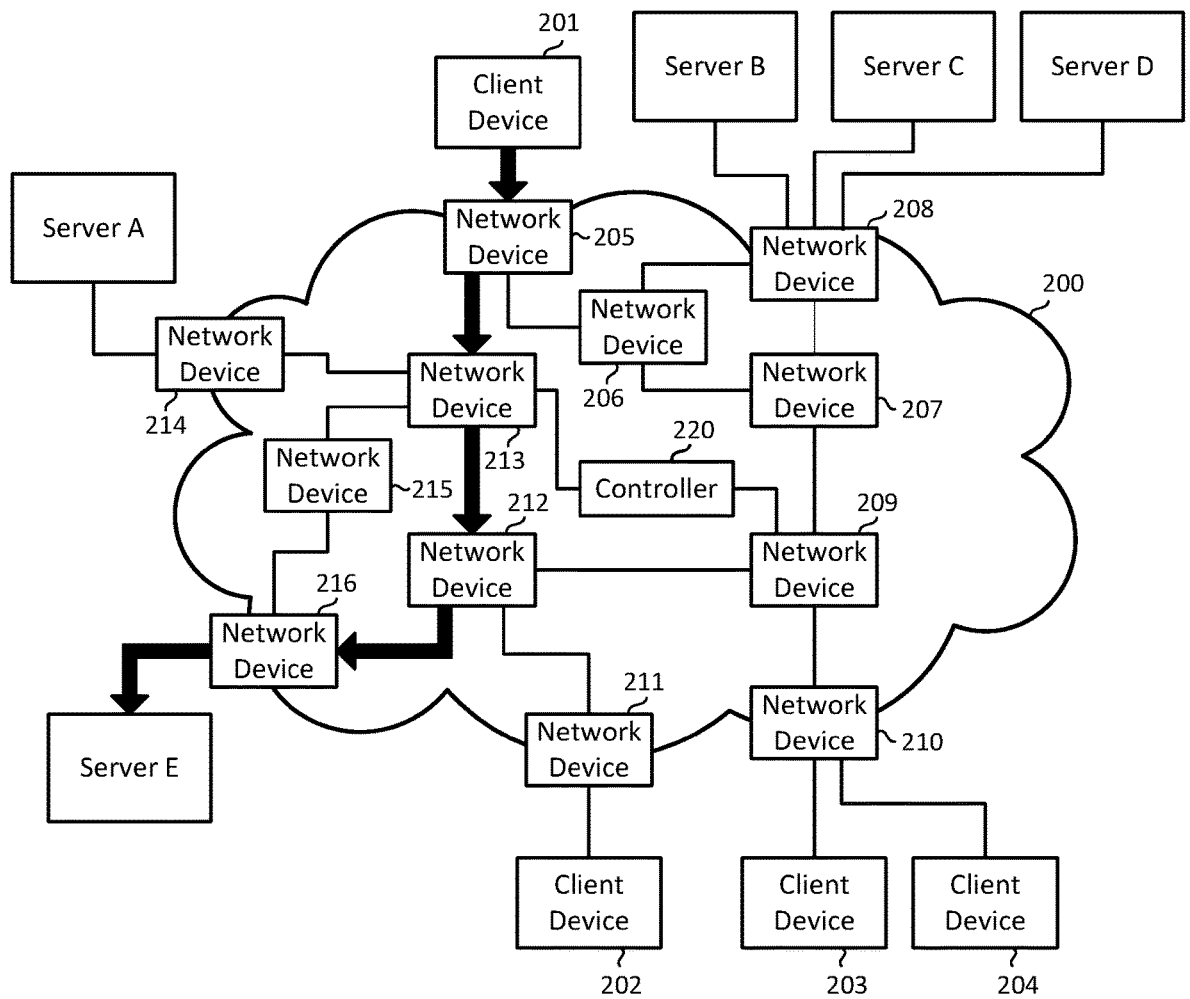
FIG. 4 illustrates the system of FIG. 2 with an example route in accordance with one or more aspects as described herein.
Figure 5:
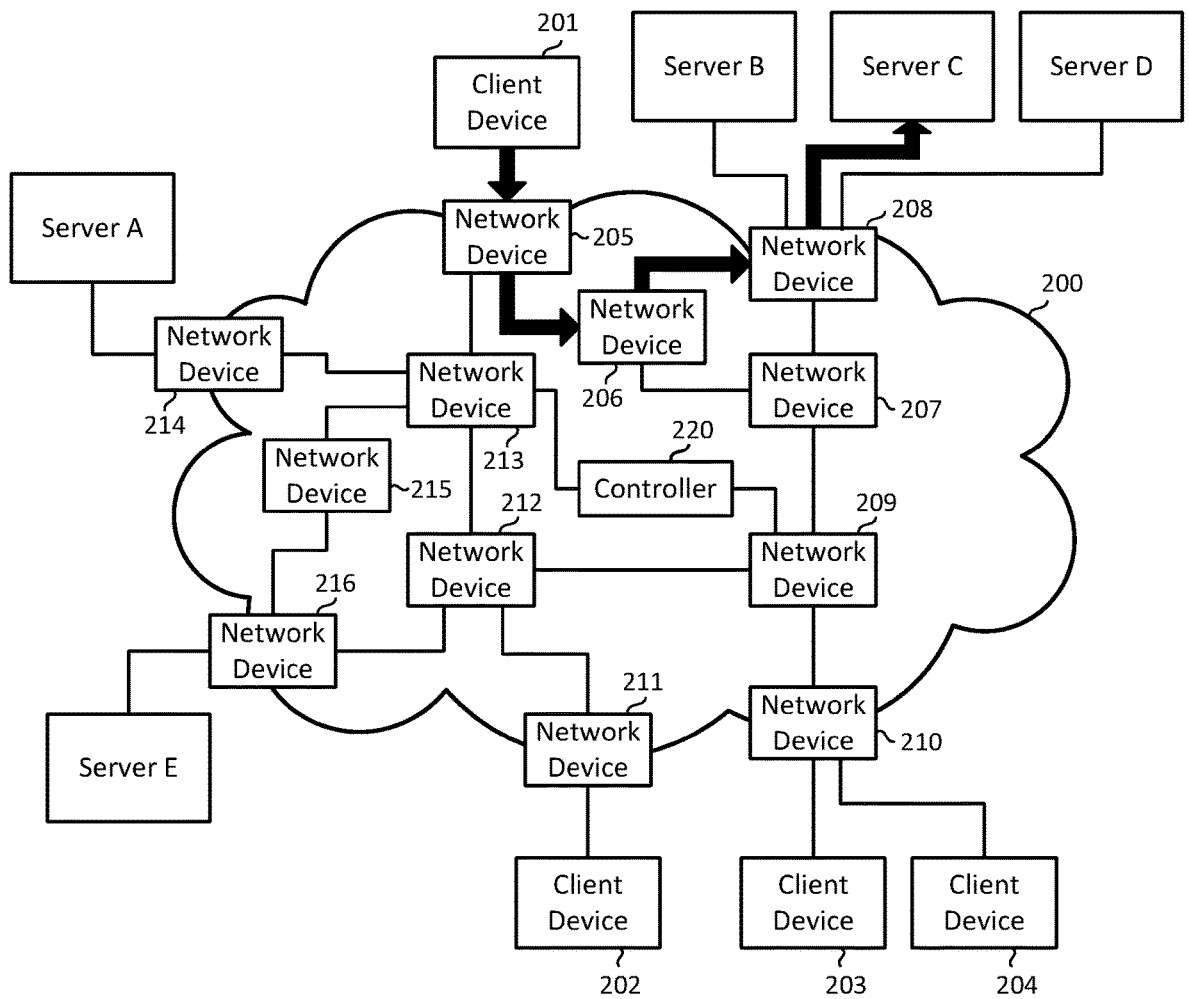
FIG. 5 illustrates the system of FIG. 2 with another example route in accordance with one or more aspects as described herein.

As shown by way of example in FIGS. 4 and 5, the packet may have been routed to other servers and/or using other paths. As previously discussed, the controller 220 may choose not only the route of the packet but also the destination of the packet. Where the destination is chosen from a load-balancing pool of servers (such as Servers A-E), the controller 220 may holistically choose both the route and the destination together as part of a single decision-making process. Examples of such a process will be described further below with reference to FIGS. 7-9. Nonetheless, it is pointed out here that the controller 220 could have alternately determined that the packet should be routed to, for instance, Server E (as indicated by the arrows in FIG. 4) or Server C (as indicated by the arrows in FIG. 5). In each of these cases, the controller 220 may selectively send appropriate routing instructions to each of the network devices in the respective route path. For instance, in the example of FIG. 4, the controller 220 may send instructions to the network devices 205, 213, 212, and 216, and in the example of FIG. 5, the controller 220 may send instructions to the network devices 205, 206, and 208.

Figure 6:
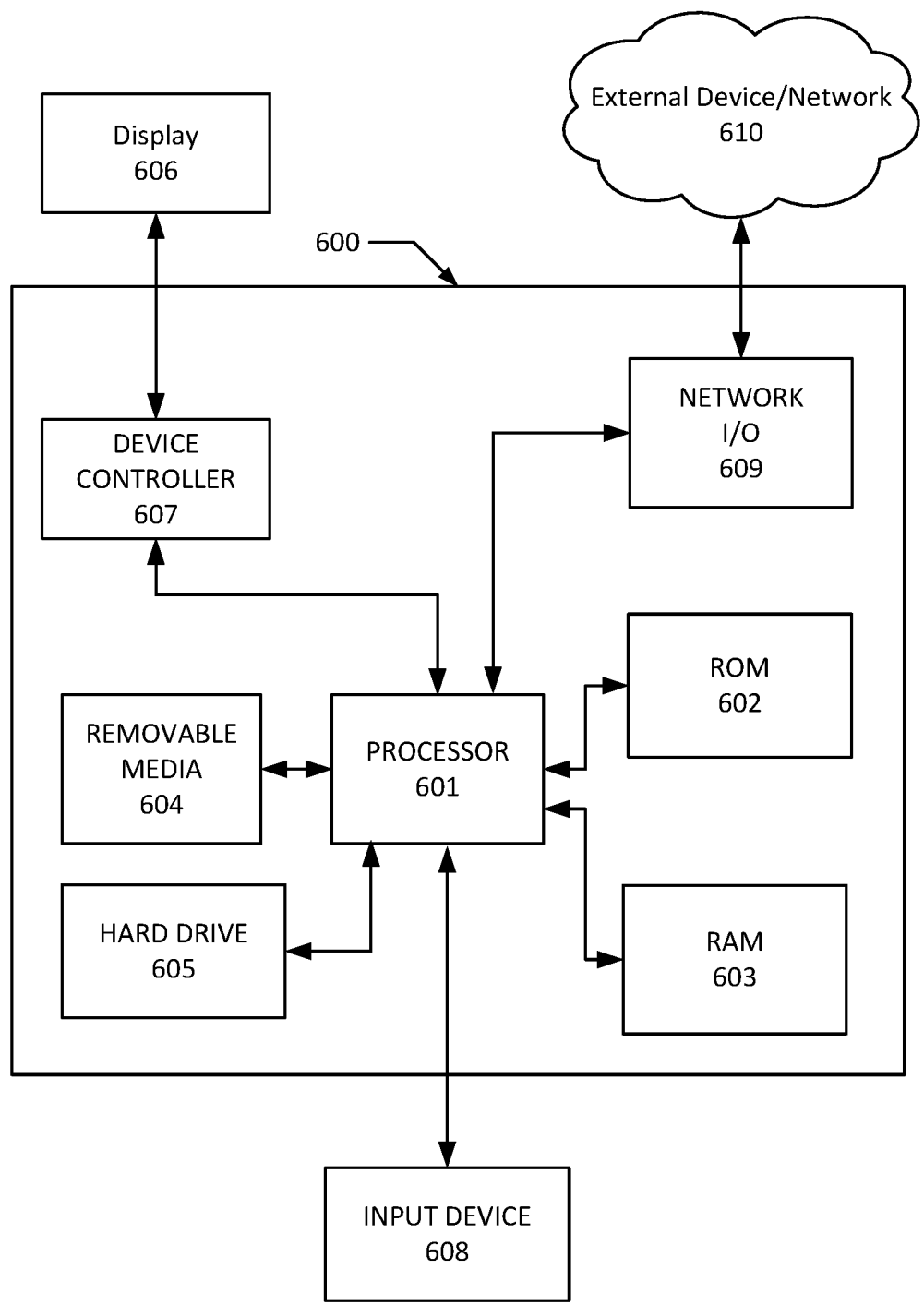
FIG. 6 illustrates an example computing device that can be used to implement any of the methods, servers, client devices, network devices, and other elements discussed herein and shown in the figures, in accordance with one or more aspects as described herein.

FIG. 6 illustrates general hardware and software elements of an example computing device 600 that may be used to implement any of the various elements discussed herein and/or depicted in any of the figures. The computing device 600 may include, for instance, one or more processors (such as processor 601), which may execute computer-readable instructions of a computer program to perform, or otherwise cause to occur, some or all of the features described herein. The instructions may be stored in any one or more types of computer-readable media to configure the operation of the processor 601. For example, the instructions may be stored in one or more memory chips (e.g., a read-only memory (ROM) 602 and/or a random access memory (RAM) 603), a hard disk drive, removable storage media 604 (such as a Universal Serial Bus (USB) drive, FLASH drive, compact disk (CD) or digital versatile disk (DVD), or floppy disk drive), and/or any other desired storage medium. Instructions may also be stored in an attached (or internal) hard drive 605. The computing device 600 may include one or more output devices, such as a display 606 (e.g., an external television) or multiple displays, and may include one or more output device controllers 607, such as a video processor. The computing device 600 may also include or be coupled with one or more user input devices 608, such as a remote control, keyboard, mouse, touch screen, microphone, video camera, etc. The computing device 600 may also include one or more network interfaces, such as a network input/output (I/O) circuit 609 (e.g., a network card) to communicate with an external device and/or network 610 (which may be or otherwise include, for example, network 200). The network input/output circuit 609 may be a wired interface, wireless interface, or a combination of the two. In some embodiments, the network input/output circuit 609 may include a modem (e.g., a cable modem), and the external device/network 610 may include any elements such as any of the elements in FIG. 1 or 2 (and/or communication links therewith), the network 200, an in-home network, the Internet, an intranet, a wide-area network, a local-area network, a provider's wireless (e.g., Wi-Fi and/or cellular), coaxial, fiber, or hybrid fiber/coaxial distribution system (e.g., a DOCSIS network), and/or any other desired network.

Modifications may be made to add, remove, combine, divide, etc. components of the computing device 600 as desired. Additionally, the components illustrated may be implemented using basic computing devices and components, and the same components (e.g., the processor 601, the ROM storage 602, the display 606, etc.) may be used to implement any of the other computing devices and components described herein. For example, the various components herein may be implemented using computing devices having components such as a processor executing computer-executable instructions stored on a computer-readable medium. Some or all of the entities described herein may be software based, and may co-exist in a common physical platform (e.g., a requesting entity can be a separate software process and program from a dependent entity, both of which may be executed as software on a common computing device).

One or more aspects of the present disclosure may be embodied in the form of, or otherwise utilize, computer-usable data and/or as computer-executable instructions, such as in one or more program modules, executed by one or more computing devices. Generally, program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 7:
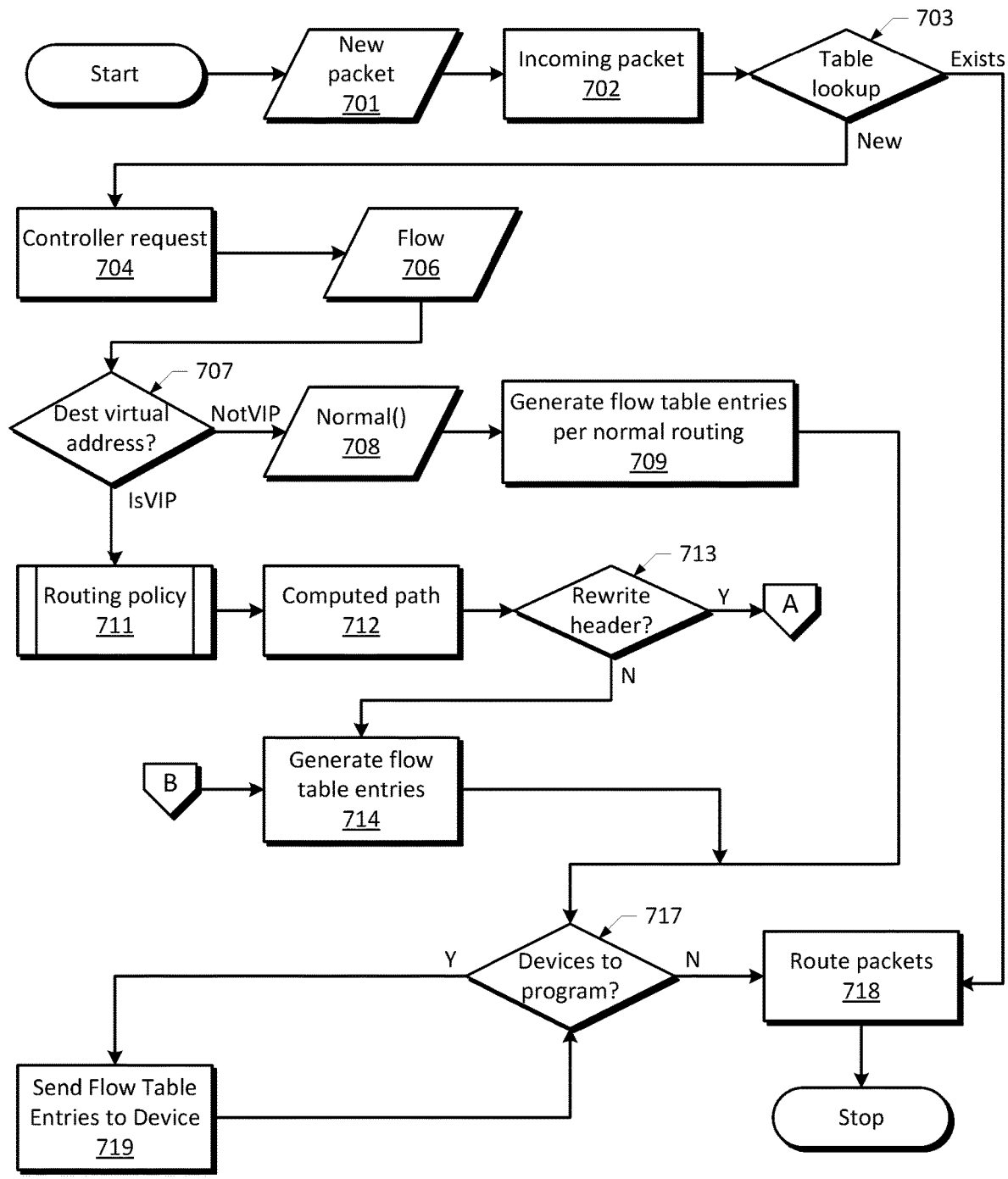
FIGS. 7-9 illustrate steps of an example process that may be performed in accordance with one or more aspects as described herein.
Figure 8:
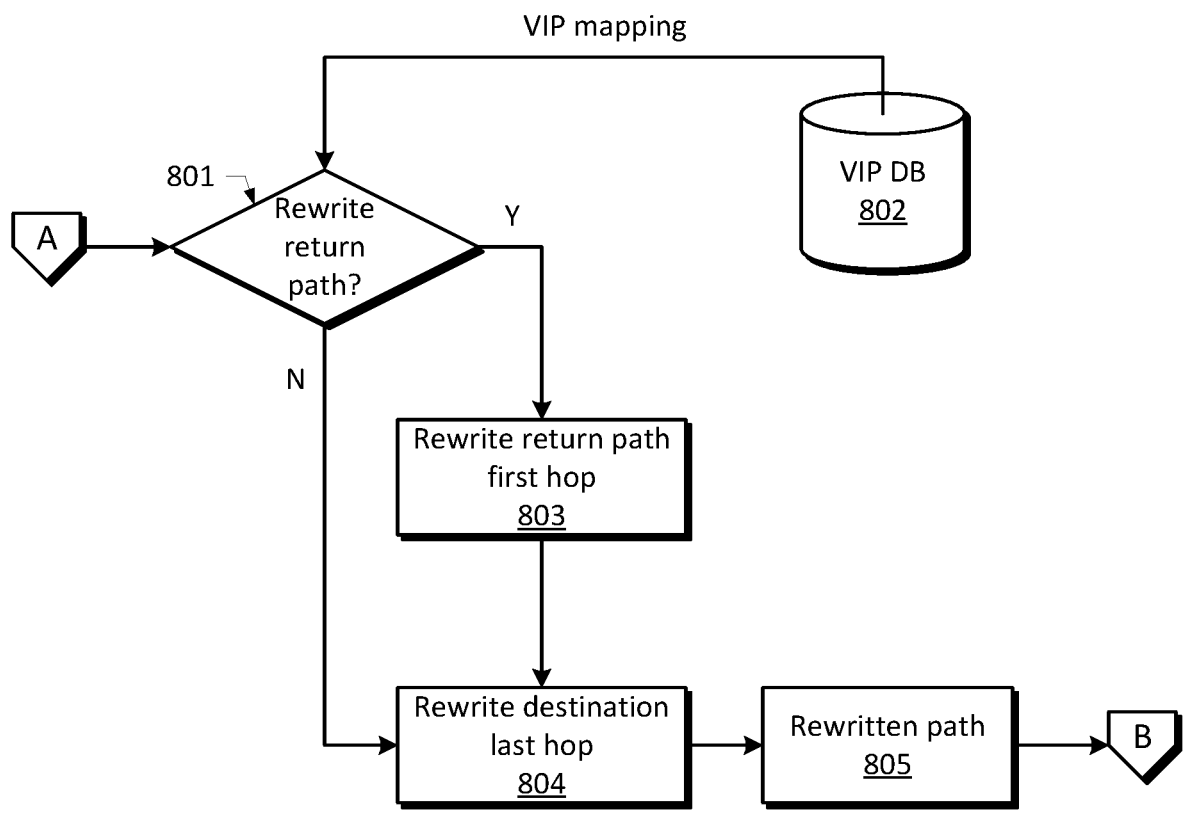
Figure 9:
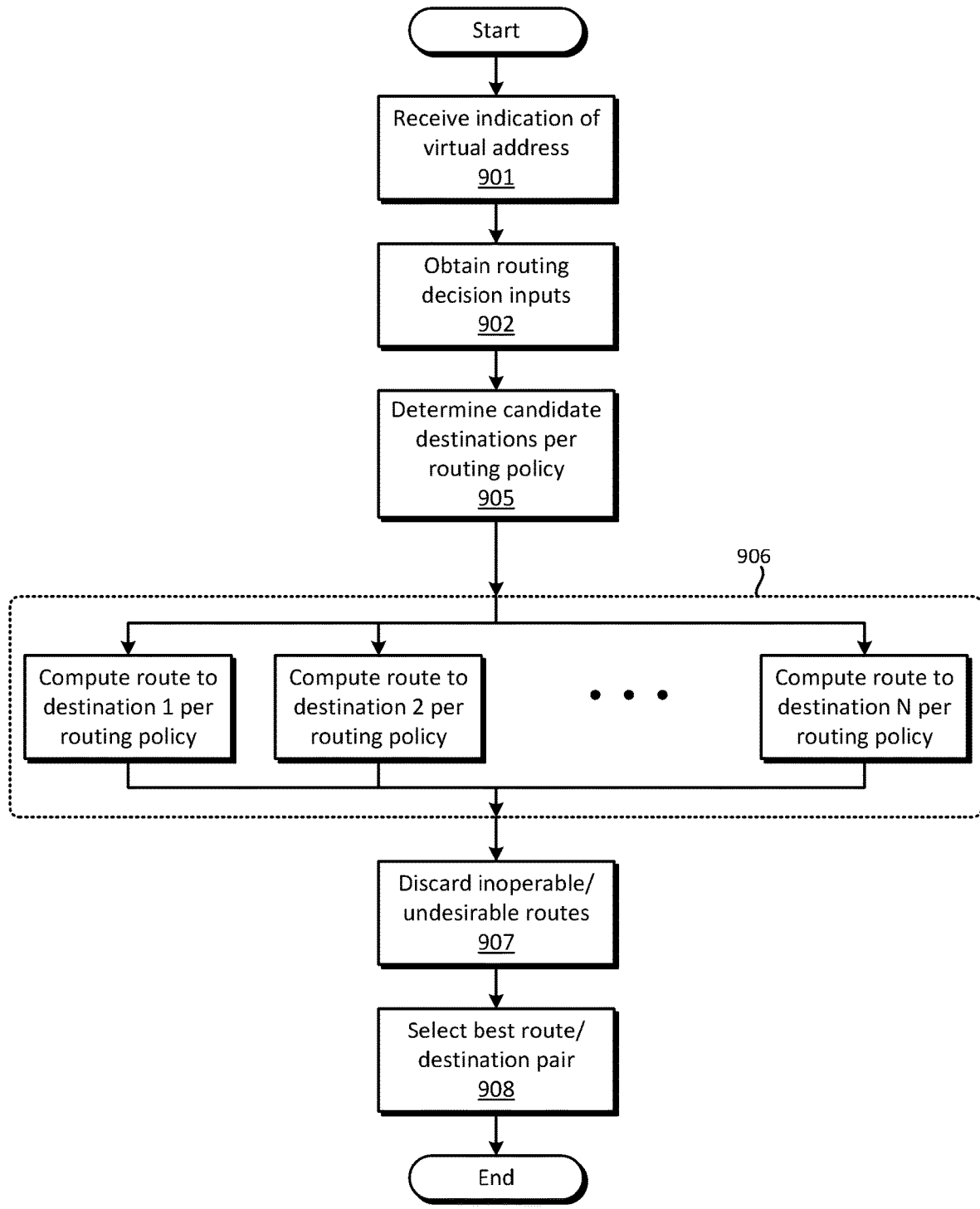

FIGS. 7, 8, and 9 illustrate steps of an example process that may be performed in accordance with one or more aspects as described herein. Any of the steps may be performed by any element, such as but not limited to any of the elements described in conjunction with and/or depicted in FIGS. 1-6. The process may be used for, e.g., planning the route of and/or routing packets through a network. By using a process such as described herein with reference to FIGS. 7-9, packet flows may be distributed to various servers in such a way to implement a load-balancing function. As explained above, such a load-balancing function may be integrated with and inter-dependent on the routing of the packets. For instance, both the route and destination of a packet may be based on load-balancing considerations.

Referring to FIG. 7, at step 701, a new packet may be ready to be sent, such as by the client device 201. The packet, which may be a TCP/IP packet, for example, may include a header that identifies, among other information, a flow. The flow may include or otherwise be identified by, for instance, an indication of the packet's source address (e.g., source IP address) and destination address (e.g., destination IP address), and possibly one or more other items of information. In some examples, the packet may be a TCP/IP SYN packet, however the packet may be any other packet. The packet may be sent to a network device for further routing. For instance, the packet may be sent to, and received by, network device 205, as indicated by way of example in FIG. 3A by the arrow 301. Thus, at step 702, the packet may be received in this example by the network device 205.

As explained above, the network device 205 (and any other network devices) may maintain a flow table that associates each of a plurality of flows (such as OpenFlow flows) or other classifications of data packets with information that identifies at least a portion of a path through a network. At step 703, the receiving device (in this example, the network device 205) may perform a lookup of its own flow table to determine whether the packet identifies an established flow or a new flow. For example, the flow table of a given network device may include information such as shown below in Table 1. The flow table for each network device may be stored locally in a computer-readable medium, such as memory, of the respective network device. Alternatively, two or more of the network devices may share a common computer-readable medium to store their flow tables.

TABLE 1

Example Flow Table

| FLOW | NEXT HOP |
|---|---|
| flow 1 | network device 213 |
| flow 2 | network device 206 |
| flow 3 | network device 213 |

In the example of Table 1, three flows (generically referred to herein as flow 1, flow 2, and flow 3) are each associated with the next hop in a route for the flow. For example, the flow table here indicates that packets in flow 1 should be forwarded to the network device 213, and packets in flow 2 should be forwarded to the network device 206. The information in the example flow table is shown generically; the actual information contained in the flow table may include, for instance, which port to send a packet through, protocol settings for sending the packet, an address of the next hop, and/or the like. Moreover, while flows such as "flow 1" are generically indicated in Table 1, the flows may be indicated in other ways, such as a destination address and destination port pair. For instance, in some embodiments, each pair of destination address/port may define a flow. In addition or alternatively, each flow may be associated in the flow table with one or more executable instructions, such as OpenFlow instructions, for how to route and/or otherwise handle packets for the flow and/or to alter the packets such as by changing address information and/or other information in the packet headers. Flows that are not established may either be entirely missing from the flow table or associated with a state other than an established state. As will be described further below, the flow table to a given network device may be populated in accordance with information provided by the controller 220. To determine the flow of a packet, one or more elements of information included in the packet header may be used, such as source address, destination address, protocol number, source port, and/or destination port. If the flow table indicates that the flow of the packet is an existing (e.g., established) flow, then the process may proceed to step 718 to route in accordance with the normal route already established for the flow. Otherwise, the process may proceed to step 704 to determine a route.

Assuming that the flow is determined at step 703 to be new, then at step 704, the network device 205 may contact the controller 220 in an attempt to obtain instructions as to how to route the packet. As explained above, some or all of the network devices in a network (including, in the present example, the network device 205) may be configured to utilize OpenFlow and/or another communications protocol to communicate with the controller 220. In the present example, at step 704, the network device 205 may send a request (such as an OpenFlow request) to the controller 220, where the request may identify information about the packet such as the flow of the packet. For instance, the request may include some or all of the header of the packet, and/or a hash key of some or all of the information in the header of the packet. In some examples, the request may include some or all of the following information from the header of the packet: the source address, the destination address, the IP protocol number, the source port, and/or the destination port. In other examples, the network device 220 may generate a hash key (also referred to herein as a flow) of some or all of these and/or other items of information and the request may include the hash key. In still further examples, the controller 220 and/or another device other than the network device 205 may generate the hash key. For instance, where the request includes some or all of the header information elements listed above, the controller 220 may generate the hash key from those information elements as received in the request.

FIG. 3A shows an example of the routing of the request from network device 205 to the controller 220. In the present example, the request may be routed from the network device 205 to the network device 213 (as indicated by the arrow 302), which may then route the request to the controller 220 (as indicated by arrow 303). To be appropriately routed to the controller 220, the request may itself include at least one packet that identifies the controller 220 as a destination address. Requests to the controller 220, and any responses from the controller 220, may be in packets with specially designated flows associated with routing instructions in the flow tables of the various devices of the network.

The controller 220 may receive the request, and in response, at step 706, the controller 220 may determine a flow (e.g., hash key) of the packet based on the request. To determine the flow, and if not already determined by another device such as the network device 205, the controller 220 may hash together some or all of the information provided in the request. For example, the controller 220 may perform a five-tuple hash of the source IP address, the destination IP address, the IP protocol number, the source port, and the destination port. In other examples, more generally an N-tuple hash may be performed, where N is any whole number greater than one. As explained above, such hashing may alternatively be performed by another device, such as by the network device 205.

At step 707, the controller 220 may determine, based on the flow (e.g., the hash key), whether the packet is addressed to a virtual IP address (VIP) or other virtual address. A virtual address is an address that is not necessarily associated with only a single physical destination and/or device, but rather one that may be associated with a plurality of different physical destinations/devices. For example, referring to FIG. 3A, a single virtual address may be associated with a pool of physical destination devices, such as some or all of Server A, Server B, Server C, Server D, and Server E. Virtual addresses may be useful to implementing load balancing services, where packets identifying the virtual address may be distributed to one or another of a plurality of servers based on a load balancing policy. For example, if the user of the client device 201 were to browse a particular website, the website address entered into the browser window may be translated by the domain name system to an IP address that is a virtual address associated with a plurality of different redundant web servers. The user of the client device 201 may not care whether (or even be aware of) the packet is sent to one of the redundant servers or another of the redundant servers, as the returned web page information may look identical to the user. From the user's perspective, the web page may be more responsive than if only a single web server were used for all web page requests. While in the above example the multiple servers may provide a set of redundant and identical services, in other examples the multiple servers associated with a virtual address may not provide identical information and/or services to the user of the client device 201.

To determine whether the packet is addressed to a virtual address at step 707, the controller 220 may maintain a list or other information identifying flows that are associated with a virtual address. The controller 220 may obtain such information from any source, such as from the servers (e.g., any of Servers A-E), another device, via manual data entry, etc. In some examples, any servers that are part of VIP or other virtual address group may identify themselves to the controller 220, possibly along with any other information such as status information about the server (e.g., server utilization, data connectivity experienced by the server, server capacity, etc.) The identification of which servers belongs to which virtual addresses may be performed independently by the servers and/or in response to a polling request from the controller 220, and may be performed at any time such as at boot-up or resetting of the server, at boot-up or resetting of the controller 220, periodically, etc. If the controller 220 determines that the flow is associated with a virtual address, then the process may proceed to step 711. Otherwise, the process may proceed to step 708, in which a normal routing policy is implemented to generate normal flow table entries at step 709 for routing packets of the identified flow to the destination and/or for returning packets from the destination.

Assuming that the flow of the packet is determined to be associated with a destination address that is a virtual address, then at step 711, the controller 220 may use a predetermined routing policy to determine, at step 712, a routing path for the packet. The routing policy used by the controller 220 may be any routing policy that is based on any number of possible inputs. For example, the routing policy may be or otherwise include a least-cost routing policy, a shortest path routing policy (e.g., an open shortest path first policy), and/or a least-latency routing policy, preferred paths. In some embodiments, the routing policy may include a combination of two or more different routing policies (sub-policies), where results of each of the sub-policies may be combined to determine a single desired route. Also, in some embodiments, the routing policy may utilize inputs other than the flow (e.g., the hash key) and/or inputs other than information provided from the packet. For example, the routing policy may utilize inputs such as measured network congestion at different portions of a network and/or on different paths within the network, time of day, day of the week, current load on one or more of the servers associated with the virtual address, expected (predicted) load and/or congestion of the servers and/or the network, and/or other information. At step 712, the path may be determined not just for the direction the packet is flowing in (e.g., in the upstream direction from the client device 201 toward one of Servers A-E), but also for the return (e.g., downstream) path if desired. The upstream and downstream paths may or may not be the same paths (e.g., may or may not utilize the same network devices). Moreover, while the initial packet in a flow has been characterized as being upstream from a client device to a server, the initial packet in a flow that triggers the "new" branch from step 703 may alternatively be a downstream packet from a server to a client device.

In determining the route, the routing policy may also be used to determine the ultimate destination of a packet that is addressed to a virtual address. For example, if Server A and Server B are both associated with the same virtual address to which the packet is directed, the controller 220 may use known information about network path congestion and/or information about (e.g., utilization of, number of flows being served by, capacity of, etc.) Servers A and/or B to determine not only the route of the packet, but also whether the packet should be routed to Server A or Server B. Thus, the particular physical destination (e.g., Server A versus Server B) may be determined as part of the routing determination, in some cases before the packet is even routed through the network.

More generally, determining the route of the packet at step at steps 711 and 712 may involve selecting both a physical destination (e.g., a real IP address or other real network address) from a plurality of candidate physical destinations associated with a virtual address as well as determining a route to the selected physical destination. Moreover, the selection of the destination may depend upon information about network conditions that are independent of the destination, such as network path congestion. For example, referring to FIG. 2, if Servers A and B are both associated with the same virtual address to which the packet is addressed, Server B might be selected if the controller 220 determines that one or more paths between the network device 205 and the network device 214 are congested, broken, or have some other problem. Likewise, Server A might be selected if the controller 220 determines that one or more paths between the network device 205 and the network device 208 are congested, broken, or have some other problem. In some examples, multiple factors may be combined together to determine the ultimate physical destination and route. For instance, the controller 220 may take into account both network congestion and the utilization of Servers A and B when determining the route and the physical destination, such as by reducing these factors to multiple values that may be combined together (e.g., as a weighted average or using a more complex algorithm depending upon the routing policy) to determine weights of candidate route/destination pairs. The route/destination pair having a weight indicating the best choice according to the routing policy might then be selected by the controller 220.

In yet another example, FIG. 9 illustrates a flow chart describing an example of the controller 220 determining a route and destination in accordance with steps 711 and/or 712. At step 901, an indication of the virtual address may be received, such as provided from the flow information at step 706 and/or step 707. The indication of the virtual address may include, for instance, the value of the virtual address and/or a listing of the physical/actual addresses associated with the virtual address. At step 902, the controller 220 may obtain one or more routing decision inputs for use in implementing the routing policy. Such routing decision inputs, if any may include those discussed above, such as network congestion and/or other problems, information about candidate destination servers (e.g., destination server utilization, capacity, number and/or types of flows currently being served, etc.) a clock input, network latency measurements, network topology, and/or the like. These routing decision inputs may be polled and/or may have already been received and stored by the controller 220 prior to step 902. At step 905, the controller 220 may determine one or more candidate physical destinations, out of the set of physical destinations associated with the virtual address, in accordance with the routing policy. A candidate destination may include, for example, a server (e.g., one or more of Servers A-E), a cluster of multiple servers, a gateway/edge device providing connectivity to a separate network that may or may not use the routing methodology described herein (e.g., that may or may not communicate with the controller 220 or a similar controller), or another type of network device. This decision may be at least partially based on the routing decision inputs obtained at step 902. For example, if the virtual address is associated with Server A, Server B, Server C, and Server D, and if Server C is currently over-utilized (e.g., utilized more than a predetermined threshold amount of utilization), then the routing policy may dictate that Server C is not presently a candidate for selection as a physical destination. In this example, the controller 220 might therefore determine that the candidates for a physical destination are Server A, Server B, and Server D.

At step 906, the controller 220 may then run a plurality of routing computations for the various multiple physical destination candidates. For example, if there are N physical destination candidates (where N is any whole number), then at least N independent routing computations may be run to determine at least N routes, at least one route (e.g., flow path) for each of the physical destination candidates. Some or all of the routes may each be multi-hop routes; that is, some or all of the routes may each contain a plurality of hops between a plurality of network devices. In some examples, more than one possible route may be computed for a given physical destination candidate. The N or more routing computations may be run in parallel (e.g., simultaneously or nearly simultaneously) or one after the other. Moreover, each routing computation may also be computed in accordance with the routing policy. For example, each routing computation may use the network topology known to the controller 220 and may be computed based on a shortest-route algorithm, a least-cost algorithm, or a least-latency algorithm. In other embodiments, more than one algorithm (e.g., shorted-route and least-cost) may be used to compute a route. In still further embodiments, two or more routes may be computed for each physical destination, where the various routes for a given physical destination may be computed using different algorithms (e.g., one route for the physical destination computed using shortest-route and another route for the same physical destination computed using least-cost).

At step 907, the controller 220 may use the status information described above to discard any of the routes computed at step 906 that would be inoperable or otherwise undesirable. For example, the controller 220 may determine, using the status information, for each of the computed routes, whether the computed route has a problematic link or path (e.g., a broken link), an overly slow and/or congested path (e.g., the latency and/or congestion of the route or portion thereof exceeds a predetermined threshold), a destination server for the route is overly utilized (e.g., utilization is more than a predetermined threshold value), not operational, not accepting new flows, etc.

At step 908, the best route/physical destination pair, from the remaining computed routes that were not discarded, may then be selected by the controller 220, again in accordance with the routing policy. For instance, the controller 220 may analyze one or more characteristics of the various computed route/destination pairs and then select the best one per the routing policy. As an example, where the routing policy is to ultimately select the shortest route, the controller 220 may select the shortest route from all of the N or more computed routes. As another example, the controller 220 may assign a score to each of the determined routes, where the scoring algorithm may depend upon the routing policy. The route with the best (e.g., highest) score may then be chosen at step 908. In further embodiments, steps 907 and 908 may be integrated in that implementing the routing policy may cause one or more routes to be discarded such as on the same basis as they would have been discarded in step 907. Returning to FIG. 7, the route/destination pair selected at step 908 may be output as a result of performing step 712.

The above are examples of how load-balancing in accordance with the concepts described herein may allow the controller 220 to make a holistic decision in which route and destination selection may be intertwined and interdependent. Moreover the load-balancing may be not just a balancing amongst multiple destination servers, but also a balancing amongst multiple possible routes through the network.

Next, at step 713, the controller 220 may determine whether the any of the network devices will need to be instructed to rewrite the header of the data packet so as to modify the source address and/or the destination address indicated by the header. For example, as explained above, for an upstream path (e.g., from the client device 201 to Server A), it may be desirable for the penultimate device (the device just prior to the ultimate destination, which is Server A in this example) to rewrite the destination address in the header of the data packet to be the address of the ultimate destination. Likewise, for a downstream path (e.g., from Server A to the client device 201), it may be desirable for the device immediately downstream from Server A (the origin server in this example) to rewrite the source address in the header of the data packet to be the address of Server A. If the determination at step 713 is that the header does not need to be rewritten, then the process may move to step 714.

If the determination at step 713 is that the header is to be rewritten, then the process may move to step 801 (FIG. 8). At step 801, the controller 220 may determine whether a header rewrite is also needed for a return path for the flow. For example, a return path may not exist if the flow is a unidirectional flow. In other words, some flows may have only one path (e.g., upstream or downstream path) while other flows may have both an upstream path and a downstream path, where one of the upstream or downstream path is a return path. If a header rewrite is not needed for a return path for the flow, then the process may move to step 804. Otherwise, the process may move to step 803.

At step 803, the controller 220 may identify, based on the pre-computed return path of the flow that was determined at step 712, which of the network devices in the return path receives the first hop after the source of the return path. For example, if the return path is from Server A to the client device 201, then in the example network of FIG. 2, the network device receiving the first hop would be the network device 214. The controller 220 may prepare instructions for the identified network device to modify the source address in the headers of return packets of the flow. For example, the source address may be modified to match the virtual destination address that was originally provided by the client device 201, or another source address that may be expected by the client device 201. Modifying the source address may make the load balancing transparent to the client device 201, in that the actual origin server address may not be included in the packet header when the packet arrives at the client device 201. In other embodiments, the controller 220 may select a different network device in the path to modify the destination address.

At step 804, the controller 220 may determine whether to rewrite the return path of the headers of the packets of the flow. For instance, the controller 220 may identify, based on the pre-computed original (non-return) path of the flow that was determined at step 712, which of the network devices in the path sends the last hop before the ultimate destination of the path. For example, if the path is from the client device 201 to Server A, then in the example network of FIG. 2, the network device sending the last hop would be the network device 214. The controller 220 may prepare rewrite instructions for the identified network device to rewrite the destination address in the headers of packets of the flow. For example, the destination address may be rewritten to match the actual address of the ultimate destination selected at step 712 (e.g., the address of Server A). In other embodiments, the controller 220 may select a different network device in the return path to rewrite the source address.

At step 805, the controller 220 may rewrite the original path and/or the return path instructions to incorporate the header address rewrite instructions. Then, the process may proceed to step 714 (FIG. 7).

Referring again to FIG. 7, at step 714, the controller 220 may generate an actual set of flow table entries containing instructions (e.g., rules) for routing the packet from, in this example, the network device 205 to the selected physical destination using the computed path resulting from step 712. In addition, this may involve determining which network devices are part of the flow path. For example, assume that Server A is selected as the physical destination and the flow path is the path from the network device 205 to network device 213, then to the network 214, and then to Server A. This flow path is indicated in FIG. 3C by way of the arrows 307, 308, and 309. In such an example, the controller 220 may determine that the network devices 205, 213, and 214 are part of the flow path and generate appropriate flow table entries for one or more (e.g., all) of the network devices in the determined flow path. Thus, referring to the present example, flow table entries may be generated for some or all of the network devices 205, 213, and/or 214. The flow table entries for the network device 205 may indicate that packets for the flow should be forwarded to the next hop of the network device 213, the flow table entries for the network device 213 may indicate that packets for the flow should be forwarded to the next hop of the network device 214, and the flow table entries for the network device 214 may indicate that packets for the flow should be forwarded to the next hop of Server A. The flow table entries may also include instructions to change addresses and/or other information in the packet header as determined from step 713. In some embodiments, the flow table entries are only generated for and/or sent to the network device that made the request to the controller 220. In other embodiments, the flow table entries are generated for and/or sent to each of (or a subset of) the network devices in the computed path for the flow.

At step 717, the controller 220 may determine whether there are any network devices to program with flow table entries that were generated at step 709 or at step 714. If the answer is "no," then the process may proceed to step 718, at which point, the controller 220 might reply to the original request by instructing the network device 205 to route the packet normally. However, in the present example, the answer would be "yes," since the network devices 205, 213, and 214 would need flow table entries containing instructions for handling the packet. Accordingly, the process may proceed to step 719.

At step 719, the controller 220 may respond to the original request by sending one or more sets of flow table entries back to the determined network devices. The loop of steps 717 and 719 may repeat until all desired network devices have been updated with appropriate flow table entries. The updating of the network devices 205, 213, and 214 (for example) is shown by way of the arrows 304, 305, and 306 in FIG. 3B. In other embodiments, the controller 220 may send flow table entries and/or other information (e.g., other instructions) only to the requesting network device (in this example, the network device 205). Then, as the packet flows through the path, each subsequent network device in the path may repeat the request/response protocol to determine where to send the packet next. For example, after the network device 205 sends a request to and receives a response from the controller 220 with flow table entries or other instructions to forward the packet to the network device 213, then the network device 213 may similarly send a request to and receive a response with flow table entries and/or other instructions from the controller 220 to forward the packet to the network device 214, and so on.

Once the network device 205 and any other network devices receive the flow table entries and/or other instructions from the controller 220, the network devices may update their respective flow tables and/or other working instruction sets with the flow table entries and/or other instructions. For example, if the above-described packet received at the network device 205 is for flow 4, then the flow table for the network device 205 may be updated to include flow 4 associated with flow table entries for, e.g., sending flow 4 packets to the next hop—the network device 213. Then, the network device 205 and the remaining network devices in the flow path may forward the packet as instructed by their respective flow tables (which may also have been updated with information received from the controller 220), such as shown by the flow path indicated by the arrows 307, 308, 309 of FIG. 3C.

While Server A is used as the physical destination in an above-described example, another server in the pool of servers associated with the virtual address may have been selected at steps 711 and 712 (in FIG. 7) and/or step 907 (in FIG. 9). For instance, FIG. 4 shows an example flow path in which Server E is selected as the physical destination, and the associated flow path would be as illustrated by the thick arrows in FIG. 4. As another example, FIG. 5 shows a flow path associated with selecting Server C as the physical destination, where the flow path in this example is illustrated in FIG. 5 using thick arrows. In each of these examples, any of the network devices that receives the packet without an existing flow may perform the process of FIGS. 7-9 starting with the "new" branch of step 703. While in each of these examples the first network device to receive the packet without an existing flow would be the network device 205, in other examples it may be a different network device.

In fact, even with the examples of FIGS. 3-5, a different network device might also receive the packet after being partially routed through a flow path and yet consider the packet not to be associated with an existing flow (according to the network device's flow table). This may occur if, for example, that network device's flow table has not been properly updated. For instance, in FIG. 4, if the flow table of the network device 212 does not list the flow of the packet as an existing flow, then the network device 212 may also use the process of FIGS. 7-9 to send a request to the controller 220, and in response the controller 220 may send instructions that may be used to update the flow table to as to appropriately route the packet to the next hop.

Other situations exist where a packet that has been partially routed may still be considered associated with a non-existing flow during routing. For instance, the controller 220 may continuously monitor the conditions that impact existing flows in the network 200, and reconfigure the paths for the flows as conditions change. By way of example, if one or more network devices report excessive congestion (e.g., above a predetermined threshold amount of congestion) or other problem in the pre-computed path of a flow, the controller 220 may, in response, dynamically modify the flow path of packets in the flow. To do this, the controller 220 can withdraw (erase, delete, invalidate, etc.) the entry for that flow in the flow table(s) for one or more of the network devices in the flow path. For example, assume that during routing of a packet through a flow path as in FIG. 4, the link between the network device 213 and the network device 212 goes down (e.g., is disconnected) or experiences excessive congestion. In response to detecting this outage or other problem with the link, the controller 220 may send out a message to the network device 213 (and possibly also the network devices 212) to withdraw one or more flow table entries for one or more flows that are supposed to travel through that link. When a packet for one of those withdrawn flows reaches the network device 213 (as passed from the network device 205), then the network device 213 may determine, at step 703, that the flow for the packet is a new flow, and so in response the network device 213 may send a request (per step 704) to the controller 220 for instructions as to how to handle packets for the flow. In addition to re-routing in response to experienced network conditions, the controller 220 may preemptively move flows to different paths in response to scheduled or predicted network or other infrastructure events. Other factors that may trigger a re-routing of a flow may include, for instance, monitored present or predicted availability of renewable energy sources coupled to and/or powering network devices of the network 200, the past performance of certain links, paths, and/or network devices in the network 200, the current cost of using certain paths and/or network devices or servers in the network 200, and/or the like.

As yet another example, there may be one or more network devices that do not participate in the flow methodology described herein (e.g., the one or more network devices may not communicate with the controller 220). This may be due to, for example, the one or more network devices not being configured to do so, or not having appropriate connectivity to the controller 220, or for another reason. Regardless of the reason, the one or more network devices might use traditional routing/switching methods (e.g., self-determine a next hop for a new flow without consulting the controller 220). Thus, a packet may be partially routed using a route dictated by the controller 220 until the packet reaches the one or more network devices mentioned above, in which case the packet may be routed outside of the route dictated by the controller 220. In this case, the next network device that uses the methodology described herein may consider the packet part of a new flow and in response request instructions for how to route packets in the flow from the controller 220. In response, the controller 220 may recalculate the route in whole or in part (e.g., the remainder of the route) based on which network device is making the request for instructions, and update any network devices with new/revised routing instructions as appropriate.

In still further embodiments, the controller 220 may aggregate flow rules and program flow actions to apply to a wider set of client traffic. This may have the effect of reducing the amount of future requests that are sent to the controller 220 from the same client device, the same subnet, and/or the same geographic region.

In the example embodiments described above, the various features and steps may be combined, divided, omitted, rearranged, revised and/or augmented in any desired manner, depending on the specific outcome and/or application. Various alterations, modifications, and improvements will readily occur to those skilled in the art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting.

The invention claimed is:

1. A method comprising:
   receiving, by a computing device and from a first network device of a plurality of network devices, a request message;
   generating, based on the request message, a flow identifier;
   determining a forward route associated with the flow identifier, wherein the forward route comprises:
   a client device of the plurality of network devices;
   a destination device of the plurality of network devices,
   the first network device, which is between the client device and the destination device, and
   an intermediary network device, of the plurality of network devices, between the client device and the destination device; and
   sending, to the first network device and the intermediary network device, the flow identifier and an instruction to route data packets based on the forward route.

2. The method of claim 1, further comprising:
   determining a return route associated with the flow identifier, wherein the return route comprises:
   the destination device,
   the first network device,
   the intermediary network device, and
   the client device; and
   sending, to the first network device and the intermediary network device, the flow identifier and a further instruction to route data packets based on the return route.

3. The method of claim 1, wherein the flow identifier is based on one or more header values of a first data packet.

4. The method of claim 1, wherein the flow identifier is based on one or more header values of a first data packet, the method further comprising:
   causing the first network device to forward the first data packet based on the flow identifier and the instruction to route data packets.

5. The method of claim 1, wherein the plurality of network devices comprises a plurality of servers storing content.

6. The method of claim 1, wherein the request message comprises a destination address of a first data packet and the flow identifier is based on the destination address, wherein the destination address is a virtual destination address corresponding to a plurality of servers, and wherein each of the plurality of servers stores content requested by the first data packet.

7. The method of claim 1, wherein the determining the forward route further comprises:
   selecting, based on a destination address of a first data packet, the forward route from a plurality of candidate routes.

8. The method of claim 1, wherein the determining the forward route further comprises:
   selecting, based on network conditions of the plurality of network devices, the destination device from a plurality of candidate destination devices.

9. The method of claim 1, further comprising:
   determining a return route associated with the flow identifier, wherein the return route comprises:
   the destination device,
   a second network device, between the client device and the destination device,
   a second intermediary network device, between the client device and the destination device, and
   the client device; and
   sending, to the second network device and the second intermediary network device, the flow identifier and a further instruction to route data packets based on the return route.

10. The method of claim 1, further comprising:
    causing the intermediary network device to route data packets, based on the flow identifier and the instruction, from the first network device to the destination device on the forward route.

11. A computing device comprising:
    one or more processors; and
    memory storing instructions that, when executed by the one or more processors, cause the computing device to:
    receive, from a first network device of a plurality of network devices, a request message;
    generate, based on the request message, a flow identifier;
    determine a forward route associated with the flow identifier, wherein the forward route comprises:
    a client device of the plurality of network devices;
    a destination device of the plurality of network devices,
    the first network device, which is between the client device and the destination device, and
    an intermediary network device, of the plurality of network devices, between the client device and the destination device; and
    send, to the first network device and the intermediary network device, the flow identifier and an instruction to route data packets based on the forward route.

12. The computing device of claim 11, wherein the instructions, when executed by the one or more processors, cause the computing device to:
    determine a return route associated with the flow identifier, wherein the return route comprises:
    the destination device,
    the first network device,
    the intermediary network device, and
    the client device; and
    send, to the first network device and the intermediary network device, the flow identifier and a further instruction to route data packets based on the return route.

13. The computing device of claim 11, wherein the flow identifier is based on one or more header values of a first data packet.

14. The computing device of claim 11, wherein the flow identifier is based on one or more header values of a first data packet and wherein the instructions, when executed by the one or more processors, further cause the computing device to:
    cause the first network device to forward the first data packet based on the flow identifier and the instruction to route data packets.

15. The computing device of claim 11, wherein the plurality of network devices comprises a plurality of servers storing content.

16. The computing device of claim 11, wherein the request message comprises a destination address of a first data packet and the flow identifier is based on the destination address, wherein the destination address is a virtual destination address corresponding to a plurality of servers, and wherein each of the plurality of servers stores content requested by the first data packet.

17. The computing device of claim 11, wherein the instructions, when executed by the one or more processors, cause the computing device to:
    determine the forward route by selecting, based on a destination address of a first data packet, the forward route from a plurality of candidate routes.

18. The computing device of claim 11, wherein the instructions, when executed by the one or more processors, cause the computing device to:
  determine the forward route by selecting, based on network conditions of the plurality of network devices, the destination device from a plurality of candidate destination devices.

19. The computing device of claim 11, wherein the instructions, when executed by the one or more processors, cause the computing device to:
  determine a return route associated with the flow identifier, wherein the return route comprises:
    the destination device,
    a second network device, between the client device and the destination device,
    a second intermediary network device, between the client device and the destination device, and
    the client device; and
  send, to the second network device and the second intermediary network device, the flow identifier and a further instruction to route data packets based on the return route.

20. The computing device of claim 11, wherein the instructions, when executed by the one or more processors, further cause the computing device to:
  cause the intermediary network device to route data packets, based on the flow identifier and the instruction, from the first network device to the destination device on the forward route.

21. A method comprising:
  receiving, by a computing device and from a first network device, a request indicating a destination address of a data packet received by the first network device, wherein the destination address is associated with a plurality of physical network devices;
  generating, based on one or more header values of the data packet, a flow identifier;
  determining a forward route associated with the flow identifier, wherein the forward route comprises the first network device, a final network device of the plurality of physical network devices, and one or more intermediate network devices;
  determining a return route associated with the flow identifier, wherein the return route comprises the final network device and a plurality of second network devices;
  sending, to the first network device and the one or more intermediate network devices, the flow identifier and an instruction to route forward data packets associated with the flow identifier to a next network device of the forward route; and
  sending, to the plurality of second network devices, the flow identifier and an instruction to route return data packets associated with the flow identifier to a next network device of the return route.

22. The method of claim 21, wherein the determining the forward route further comprises:
  selecting, based on the destination address, the one or more intermediate network devices, and one or more of a least-cost algorithm or a shortest-path routing policy, the forward route.

23. The method of claim 21, further comprises:
  based on the final network device, modifying, from the destination address to a final network address, the one or more header values.

24. The method of claim 21, wherein the determining the forward route is based on a determination that the data packet is not associated with an existing flow identifier.

* * * * *

UNITED STATES PATENT AND TRADEMARK OFFICE
CERTIFICATE OF CORRECTION

| | |
|---|---|
| PATENT NO. | : 11,050,668 B2 |
| APPLICATION NO. | : 15/891798 |
| DATED | : June 29, 2021 |
| INVENTOR(S) | : Luke et al. |

It is certified that error appears in the above-identified patent and that said Letters Patent is hereby corrected as shown below:

In the Specification

Column 3, Detailed Description, Line 48:
Delete "the" and insert --The-- therefor Column 4, Detailed Description, Line 61:
Delete "201-216" and insert --205-216-- therefor Column 4, Detailed Description, Line 64:
Delete "201-216" and insert --205-216-- therefor Column 7, Detailed Description, Line 5:
Delete "320," and insert --220,-- therefor Column 16, Detailed Description, Line 16:
After "network", insert --device--

Signed and Sealed this
Eighteenth Day of April, 2023

Katherine Kelly Vidal
*Director of the United States Patent and Trademark Office*